United States Patent
Singh et al.

(10) Patent No.: US 8,654,765 B2
(45) Date of Patent: Feb. 18, 2014

(54) DISTRIBUTED NETWORK FLOW EXPORTER

(75) Inventors: Akshya Kumar Singh, Cupertino, CA (US); Anuraag Mittal, San Jose, CA (US); Srinivas Sardar, Fremont, CA (US); Cesare Cantu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/288,417

(22) Filed: Nov. 3, 2011

(65) Prior Publication Data

US 2013/0114612 A1    May 9, 2013

(51) Int. Cl.
*H04L 12/28* (2006.01)
(52) U.S. Cl.
USPC ............ 370/389; 370/392; 370/235; 370/466
(58) Field of Classification Search
None
See application file for complete search history.

(56) References Cited

U.S. PATENT DOCUMENTS

| 8,335,160 | B2* | 12/2012 | Carvalho et al. | 370/235.1 |
| 2007/0171827 | A1* | 7/2007 | Scott et al. | 370/235 |
| 2007/0217425 | A1* | 9/2007 | Claise et al. | 370/392 |
| 2009/0228586 | A1* | 9/2009 | Claise et al. | 709/224 |
| 2013/0136128 | A1* | 5/2013 | Robinson et al. | 370/392 |

OTHER PUBLICATIONS

Cisco NetFlow Services Solutions Guide, Jan. 22, 2007.

* cited by examiner

*Primary Examiner* — Duc C Ho
(74) *Attorney, Agent, or Firm* — Edell, Shapiro & Finnan, LLC (57) ABSTRACT

A network appliance that is part of a distributed virtual switch collects network flow information for network flows passing through the network appliance. The network flow information is encapsulated into packets as a data record for transport. Network flow exporter type information is added to the network flow records configured to indicate that the packets are from a distributed exporter. An option template is sent to the network flow data collectors that includes a device identifier that is configured to uniquely identify the network appliance. The packets are exported to the network flow data collector. The network flow data collector uses the network flow exporter type information and the device identifier to associate the network flow information with the distributed virtual switch.

24 Claims, 5 Drawing Sheets

DISTRIBUTED NETWORK FLOW EXPORTER

TECHNICAL FIELD

The present disclosure relates to exporting network flow data from a distributed virtual switch.

BACKGROUND

Data centers may host applications and store large amounts of data for an organization or multiple organizations. Computer networks in these data centers rely on sophisticated services to enable scalability, virtualization, redundancy, and security. These services include load balancing, firewalls and fine grain network metrics. As cloud computing and other large scale virtual server deployments grow, providing these network services in a scalable and manageable fashion is increasingly challenging.

Ideally, each individual network flow in a large scale server deployment is tracked in order to monitor appropriate services, e.g., quality of service, policies, etc., to an identified connection or flow. The network flows are defined as a unidirectional data flow from a single source to a single destination. Protocols have been developed to monitor the characteristics of network flows. NetFlow, developed by Cisco Systems, Inc., and Internet Protocol Flow Information eXport (IPFIX), devised by an Internet Engineering Task Force (IETF) working group, are examples of widely used protocols. In some cases, data center switches may provide the network flow monitoring, but the number of individual flows passing through a single switch may use excessive switch resources to track and manage each flow. In a virtualized network environment there may be thousands of such network flows.

DESCRIPTION OF EXAMPLE EMBODIMENTS

Overview

A network appliance that is part of a distributed virtual switch collects network flow information for network flows passing through the network appliance. The network flow information is encapsulated into packets as a network flow record for transport. Network flow exporter type information is added to the network flow records to indicate that the packets are from a distributed exporter. A device identifier is exported to uniquely identify the network appliance. The packets are exported to a network flow data collector.

Example Embodiments

Figure 1:
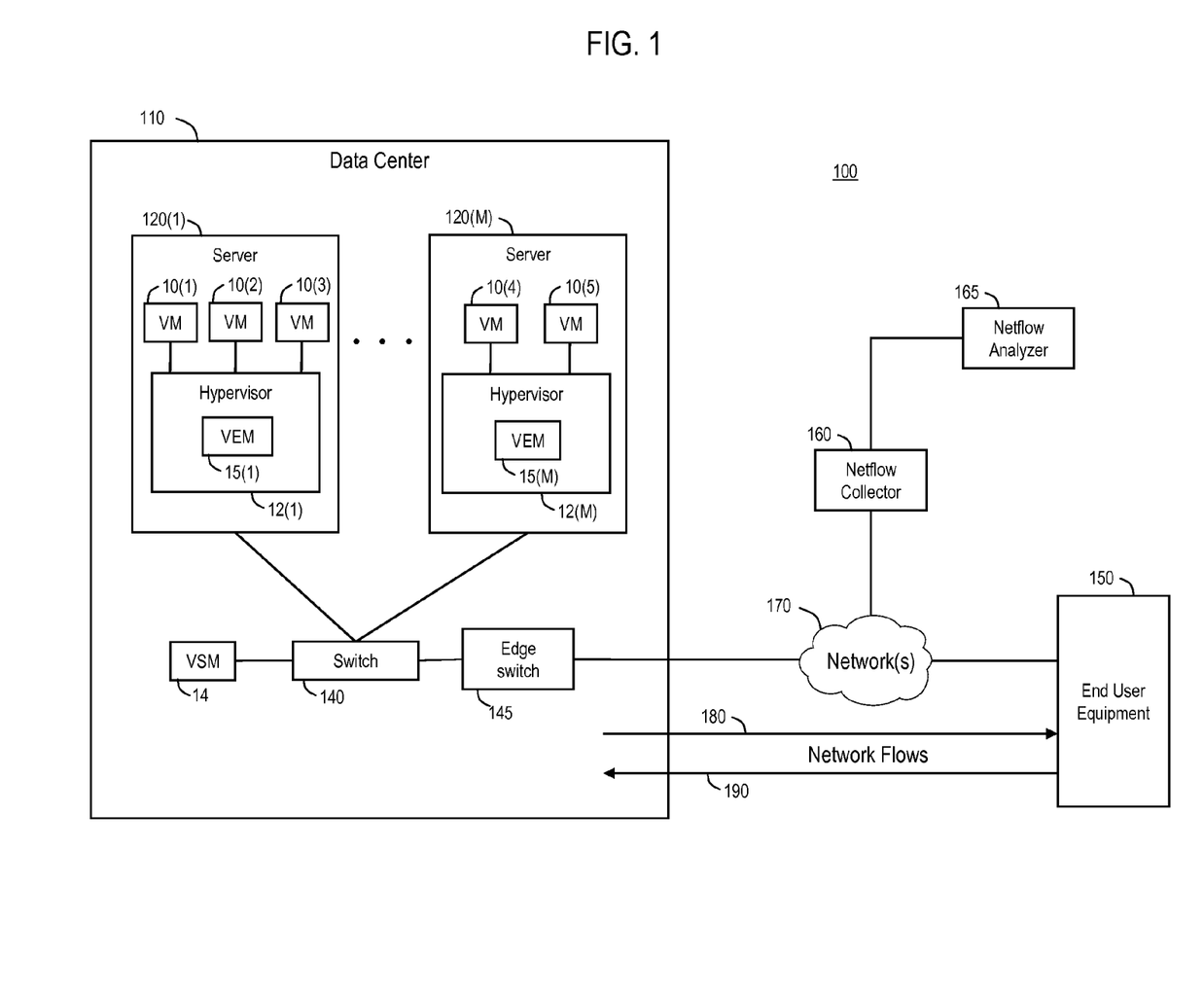
FIG. 1 is a block diagram showing example data center and end user equipment coupled by a network, where distributed virtual switches (DVSs) in the data center are configured to export network flow information in a distributed fashion.

Referring first to FIG. 1, an example system 100 is shown for a data center environment that provides hosting services for end user equipment. System 100 comprises a data center 110, end user equipment 150, a network flow (NetFlow) collector 160, and a NetFlow analyzer 165 that communicates over one or more networks 170. The term "NetFlow" is well known and refers to a protocol to monitor characteristics of network flows. The data center 110 comprises an edge switch 145 and switch 140. Coupled to the switch 140 is a plurality of servers 120(1)-120(M) and a virtual supervisor module (VSM) 14. The servers 120(1)-120(M), e.g., blade servers, may host application services, e.g., World Wide Web server applications or remotely hosted VM applications for use at end user equipment 150.

Each of the servers 120(1)-120(M) has a hypervisor, as indicated by reference numerals 12(1)-12(M), and a Virtual Ethernet Module (VEM), as indicated by reference numerals 15(1)-15(M). The hypervisors 12(1)-12(M) provide hardware abstraction services for virtual machines (VMs) 10(1)-10(5), i.e., hypervisors 12(1)-12(M) provide hardware abstraction in order to provide operating system (OS) independence for applications run by VMs 10(1)-10(5). VEMs 15(1)-15(M) are software based virtual switches that provide switching at Layer 2 (data link layer) and Layer 3 (network layer) of the Open Systems Interconnect (OSI) model. The VEMs 15(1)-15(M) each provide virtual switching for their hosted VMs, and as such, the VEMs 15(1)-15(M) each provide switching across a plurality of underlying hardware modules, thereby forming a Distributed Virtual Switch (DVS). The VSM 14 controls the VEMs 15(1)-15(M) and allows them to operate together as a single logical switch.

In this example, a plurality of network flows 180 and 190 are exchanged between end user equipment 150 and the data center 110 over network(s) 170. Each network flow represents a single unidirectional Layer 3 (L3) flow from a single source to a single destination. Network flows 180 are from the data center 110 to the end user equipment 150, while network flows 190 are from the end user equipment 150 to the data center 110. Each of the individual flows within flows 180 and 190 may be monitored and statistics are kept on each flow, e.g., flow start and end times, number of packets sent, etc., as will be explained below. Periodically, the NetFlow statistics are exported to the NetFlow collector 160 and can be analyzed by NetFlow analyzer 165. By analyzing the NetFlow statistics, network operators can get a "big picture" of network volume and flow, and fix any network deficiencies, e.g., traffic bottlenecks.

It should be understood, that the system 100 shown in FIG. 1 is simplified for ease of illustration. For example, the data center 110 comprises access switches, aggregation switches, core switches to aggregate and distribute ingress (upstream traffic), and egress (downstream traffic). Further, a plurality of switches is provided at each access, aggregation, and core level to achieve redundancy within the data center 110. Further, the data center 110 provides mass storage, e.g., in the form of Storage Area Networks (SANs). The network flows may also be monitored between each of these devices. To further complicate the NetFlow monitoring process, in a virtualized environment like that of system 100, each of the network flows may be monitored between each virtual device, e.g., VM to VM traffic flows. Servers 120(1)-120(M) may support thousands of such flows.

It should also be understood that network(s) 170 may comprise any number of networks both inside and outside the data center 110, e.g., the Internet, private, and other internal or external networks. The NetFlow collector 160 and NetFlow analyzer 165 may also reside within data center 110.

In a typical switch that is not designed for virtualization, each line card (LC) in the switch maintains a NetFlow cache to store the NetFlow statistics, that is, statistics collecting from monitoring network flows using the NetFlow protocol, as an example. Each LC is also connected to a hardware supervisor module by way of a hardware backplane connection. The LCs export their NetFlow statistics through the backplane to the hardware supervisor module. The hardware supervisor module forwards the NetFlow statistics to the NetFlow collector as a single switch. This type of NetFlow statistics export does not pose a burden for the hardware supervisor module due to the hardwired connections through the backplane which provide a direct one-to-one LC-to-hardware supervisor module connection.

However, in a DVS, data are exchanged between VEMs and the VSM, e.g., VSM 14, at the L2/L3 levels without the benefit of a one-to-one physical hardware connection, i.e., traffic is routed instead of using a direct point-to-point connection. For example, each of the processing LCs supporting a VEM, collects NetFlow statistics for flows passing through the LC. When it comes time to export the NetFlow statistics, they are routed to the VSM at the L2/L3 level. The VSM has to process the L2/L3 packets as a router which imposes a heavy processing burden on the VSM. Further, the VSM becomes a single point of failure, and when it is reloaded, pending batches of NetFlow statistics may be lost. To alleviate these and other problems, the techniques described herein allow the NetFlow statistics to be exported directly from each line card to the NetFlow collector, e.g., NetFlow collector 160. Accordingly, instead of a single point exporter by the VSM, the DVS becomes a distributed exporter without overburdening the VSM.

Figure 2:
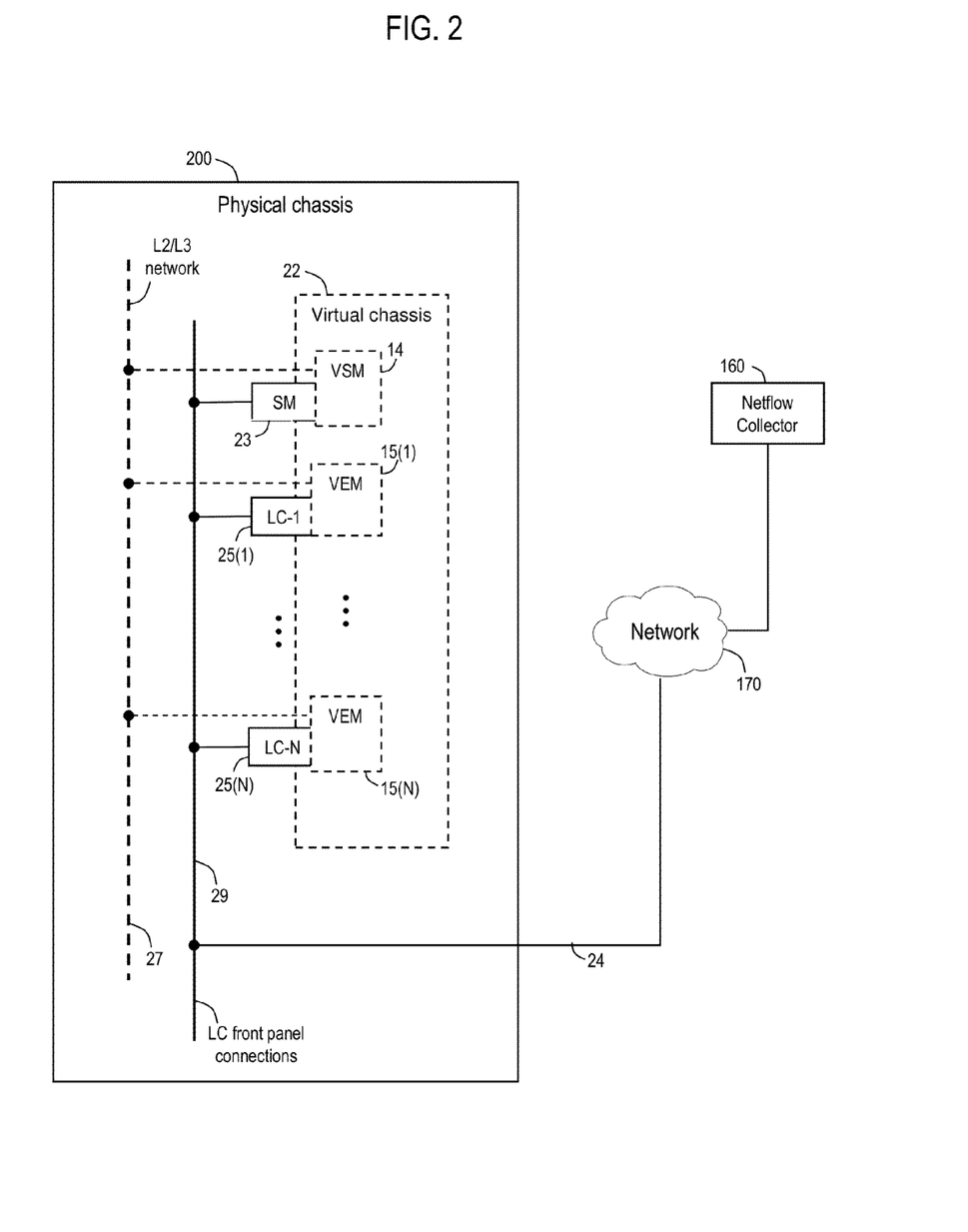
FIG. 2 is an example of a block diagram of a DVS that is configured to perform distributed network flow exporting according to the techniques described herein.

Turning to FIG. 2, an example of a block diagram of a DVS that is configured to provide a distributed NetFlow export will now be described. FIG. 2 shows a physical chassis 200, as well as the network 170 and the NetFlow collector 160 from FIG. 1. In this example, the physical hardware is shown by solid lines, while virtual software components are shown as dashed lines as a conceptual overlay to the actual hardware.

The virtual components comprise the VSM 14 configured as an LC and VEMs 15(1)-15(N). The VSM 14 and VEMs 15(1)-15(N) form a virtual chassis shown at reference numeral 22, which is not necessarily bound/limited to the exact hardware shown. The VSM 14 and VEMs 15(1)-15(N) may communicate using an L2/L3 network 27 through a switched fabric. The physical hardware comprises a supervisor module (SM) 23 that hosts the VSM 14 and processing LCs 25(1)-25(N) that support VEMs 15(1)-15(N), respectively. The LCs connect to outside networks via front panel ports collectively shown at reference numeral 29. In other examples, the LCs may be hardware Network Interface Cards (NICs). For simplicity, the term "line cards" may also refer to NICs.

Without use of the techniques described herein, each of the VEMs 15(1)-15(N) would export the data accumulated in their NetFlow caches to the VSM 14 by way of L2/L3 network 27. All of the NetFlow route processing would occur on SM 23 as a single source exporter. The single source exporter model works well as long as the observing domain is confined to hardware. For a DVS, e.g., such as the Cisco Systems' Nexus 1000V or Cisco Systems' Unified Computing System (UCS), where the LCs are distributed over L2/L3 networks, the single source model does not scale. As the number of LCs and network devices per LC increases, the single source model has several limitations: 1) the number of flows are very high and the single source exporter becomes a point of failure, 2) the single source exporter might not able to serve all the line cards distributed over the network due to memory and processor limitations, 3) the single source exporter acting as proxy for the data from all other LCs distributed over network is an inefficient use of the network usage, and 4) the VSM may become overwhelmed by several LCs that may result in latency or failure of other VSM features.

However, by virtue of a distributed exporter model, the limitations of the single source model may be overcome. In the distributed exporter model, each line card exports its own NetFlow cache directly to the NetFlow collector, with only limited supervisor functions for the export provided by the VSM. Export from the LCs may be made using, for example, the User Datagram Protocol (UDP) or Stream Control Transmission Protocol (SCTP) as the transport mechanism. The process for distributed export is described in greater detail in connection with FIG. 4.

Figure 3:
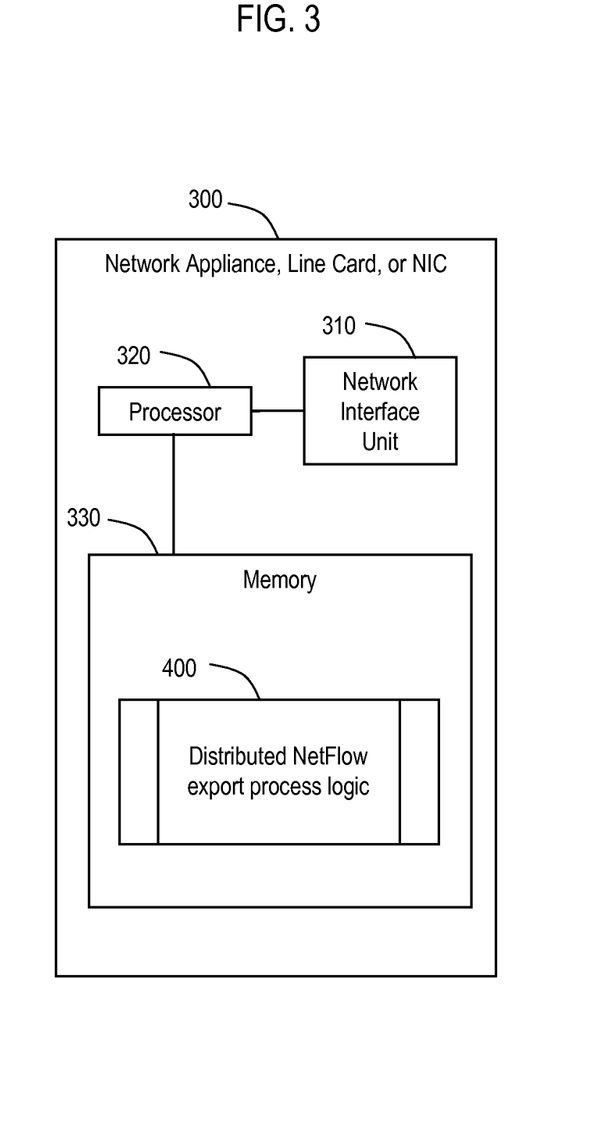
FIG. 3 is an example hardware block diagram of a network device, e.g., a network appliance or line card, configured to export distributed network flows.

Turning now to FIG. 3, an example block diagram of a network appliance or line card 300 is shown. For ease of illustration the network appliance will be referred to as LC 300 in the description of FIG. 3. LC 300 comprises a network interface unit 310, a processor 320 and a memory 330. The memory 330 stores process logic according to a distributed exporter model and is referred to herein as distributed NetFlow export process logic 400. The network interface unit 310 is coupled to the processor 320 and is configured to transmit and receive messages over one or more networks, e.g., networks 170. Additionally, the network interface unit 310 is configured to transmit a template, e.g., a NetFlow options template, that defines the format of the export packet headers and data payload according to the techniques described herein.

Processor 320 is coupled to the network interface unit 310 and to the memory 330. Processor 320 is a microprocessor or microcontroller that is, for example, configured to execute program logic instructions (i.e., software) for carrying out various operations and tasks described herein. For example, processor 320 is configured to execute distributed NetFlow export process logic 400 that is stored in memory 330 to enable a secure migration of VMs among various network appliances. Memory 330 may comprise read only memory (ROM), random access memory (RAM), magnetic disk storage media devices, optical storage media devices, flash memory devices, electrical, optical or other physical/tangible memory storage devices.

The functions of processor 320 may be implemented by logic encoded in one or more tangible computer (non-transitory) readable storage media (e.g., embedded logic such as an application specific integrated circuit (ASIC), digital signal processor (DSP) instructions, software that is executed by a processor, etc), wherein memory 330 stores data used for the operations described herein and stores software or processor executable instructions that are executed to carry out the operations described herein.

The distributed NetFlow export process logic 400 may take any of a variety of forms, so as to be encoded in one or more tangible computer readable memory media or storage device for execution, such as fixed logic or programmable logic (e.g., software/computer instructions executed by a processor) and the processor 320 may be an (ASIC) that comprises fixed digital logic, or a combination thereof. For example, the processor 320 may be embodied by digital logic gates in a fixed or programmable digital logic integrated circuit, which digital logic gates are configured to perform the distributed NetFlow export process logic 400. In general, the distributed NetFlow export process logic 400 may be embodied in one or more computer readable storage media encoded with software comprising computer executable instructions and when the software is executed operable to perform the operations described herein for the process logic 400.

Figure 4A:
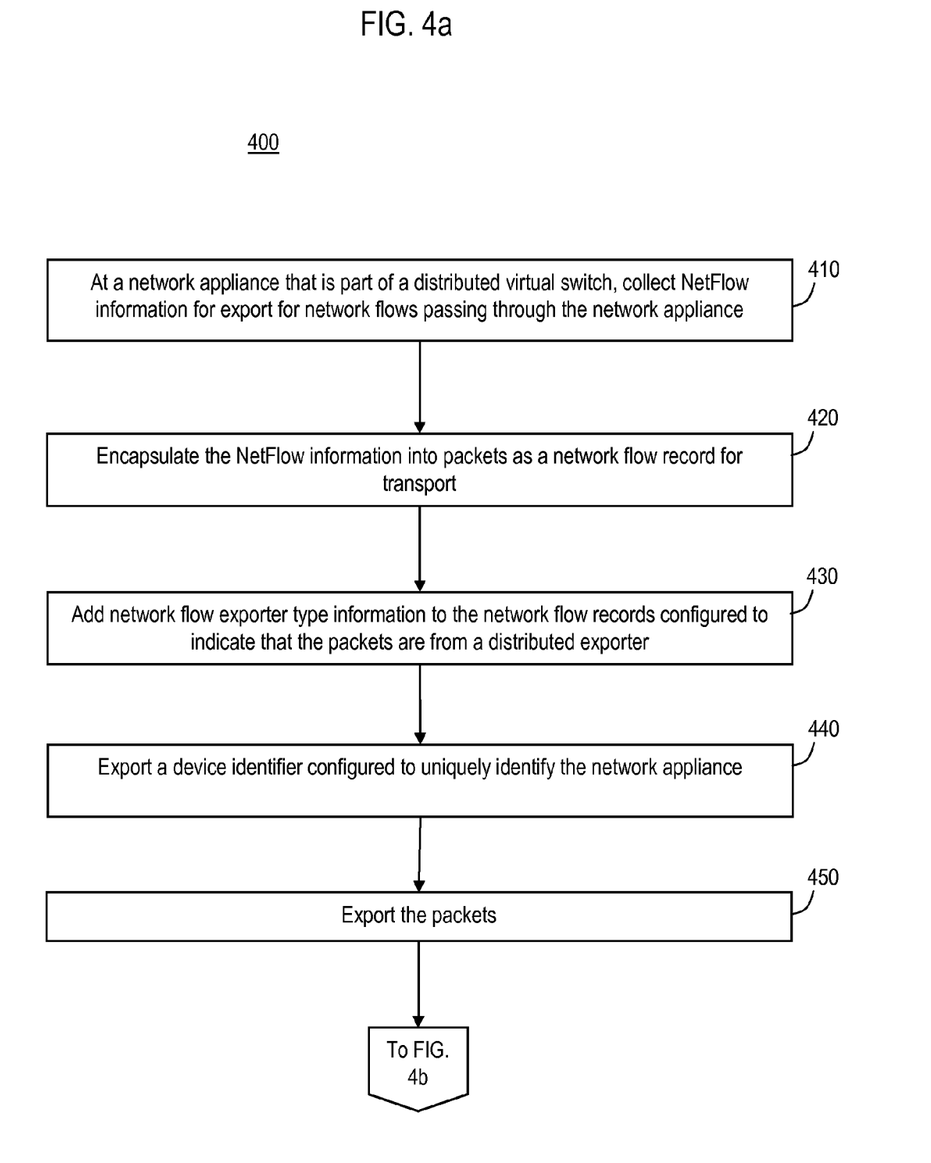
FIGS. 4a and 4b depict a flowchart of a process for exporting distributed network flows.
Figure 4B:
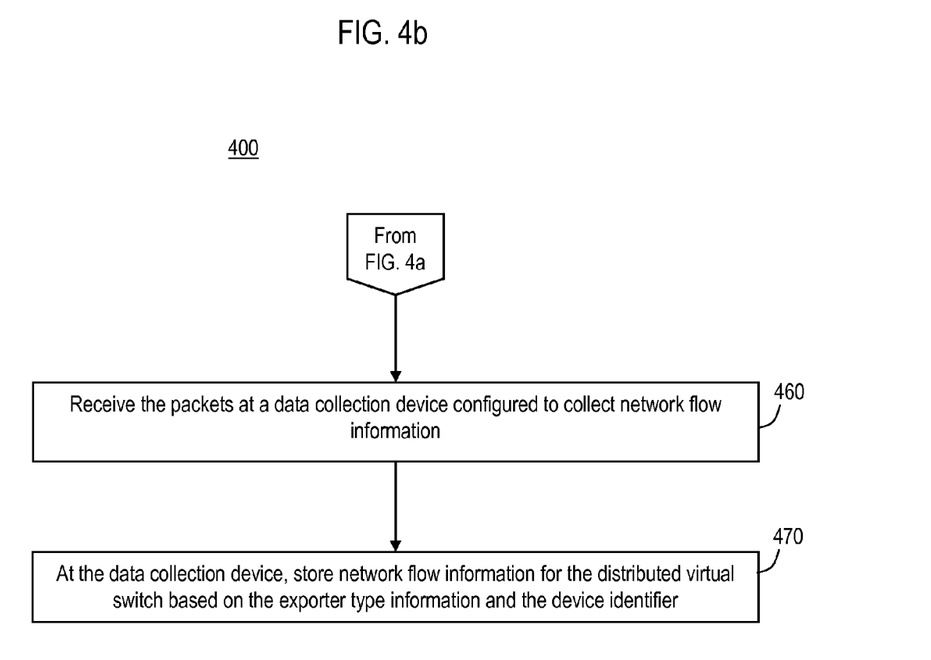

Referring to FIGS. 4a and 4b, a flowchart that depicts the distributed NetFlow export process logic 400 is now described. At 410, a network appliance that is part of a distributed virtual switch collects network flow information for network flows passing through the network appliance. Since flows may both ingress and egress the network appliance, statistics are maintained for either ingress or egress traffic. At 420, the network flow information is encapsulated into packets as a network flow record for transport. At 430, network flow exporter type information is added to (incorporated in) the network flow records configured to indicate that the packets are from a distributed exporter.

To achieve individual LC export, a modification to the network flow protocols is used to achieve the desired result at the NetFlow collector. In traditional NetFlow processing, to identify a NetFlow exporter the NetFlow collector uses information in the NetFlow header, e.g., source ID and a source IP address from the IP packet. As such, it may be possible to assign an IP address to the individual LCs and each LC uses its own IP address to export NetFlow packets. However, this scheme breaks the distributed context of a virtual switch, i.e., if each NetFlow collector identifies each exporter based on the source IP address, then each Line Card will show up as a separate switch rather than part of a DVS. In essence, the customer can lose the flexibility of monitoring the traffic across the DVS.

Furthermore, as the number of LCs increase, the memory requirements of the collectors also increases and might not scale. In addition, the NetFlow collectors may collect additional details for the exported NetFlow information, e.g., for a detailed description of an LC based on a source ID, interface related information, etc. To acquire the additional information, the NetFlow collectors send a Simple Network Management Protocol (SNMP) query back to the exporter based on the source IP address. Since LCs do not typically implement SNMP agents, it may not be possible to query each line card. Even when LCs run an SNMP agent, the LCs may not have the additional information available, e.g., because most of the additional information is maintained by the VSMs.

One modification to the NetFlow protocol is to add a new value to an "engine type" field in the NetFlow flow-record. The engine type field identifies the type of flow switching engine. The engine type field is vendor specific. In one example, the flow switching engine type values are:
  value 0 identifies the engine as a Route Processor
  value 1 identifies the engine as a Versatile Interface Processor VIP or LC
  value 2 identifies the engine as a Policy Feature Card (PFC) or Distributed Forwarding Card (DFC)
By adding a fourth value, e.g., the value 3, a dedicated value could be used to identify/signify that the export engine is a distributed exporter. The values may be maintained by way of an enumerated data structure. Identifying the engine type as a distributed exporter tells the collector to look for additional identifying data to aggregate network flows common to the DVS.

At 440, a device identifier is sent, transmitted, or otherwise exported, e.g., to the NetFlow collector using one or more option templates to uniquely identify the network appliance. The device identifier is referred to as a distributed exporter ID and is unique for hardware elements that export NetFlow data for the DVS. In other words, each exporter for the DVS has its IP address associated with the distributed exporter ID. In one example, the distributed exporter ID may include an IPv4 or IPv6 address and a universally unique identifier (UUID) for the network appliance.

A UUID is an identifier standardized by the Open Software Foundation (OSF) for Distributed Computing Environments (DCEs). The intent of UUIDs is to enable distributed systems to uniquely identify information without significant central coordination. Any computing system can generate a UUID and use it to identify something with reasonable confidence that the same identifier will never be unintentionally created by another system to identify something else. Information labeled with UUIDs can therefore be later combined into a single database without needing to resolve name conflicts or other information.

At 450, the packets are exported. Continuing to FIG. 4b, at 460, the packets are received at a data collection device, e.g., NetFlow collector 160 (FIG. 1), that is configured to collect network flow information. At 470, the data collection device stores network flow information for the distributed virtual switch based on the exporter type information and the device identifier. The NetFlow collector executes a lookup to determine the distributed exporter ID based on the source IP address received from the NetFlow packet. NetFlow collectors will use the distributed exporter ID as a key for identification of the network exporter rather than using the source IP address from the NetFlow packet, i.e., each distributed exporter associated with a DVS has its IP address translated to the distributed exporter ID for purposes of data collection and analysis. The combination of the engine type and distributed exporter ID enables NetFlow collectors to represent a single DVS.

In sum, techniques are provided for a network appliance that is part of a distributed virtual switch to collect network flow information for network flows passing through the network appliance. The network flow information is encapsulated into packets as a network flow record for transport. Network flow exporter type information is added to packet headers to indicate that the packets are from a distributed exporter. A device identifier is sent to the collector using NetFlow option templates that uniquely identify the network appliance. The packets are exported to a network flow data collector.

The packets are received at a data collection device configured to collect network flow information. The data collection device classifies and stores network flow information for the distributed virtual switch based on the exporter type information and the device identifier.

The network flow exporter type information may include a distributed exporter engine "type" for an engine type field that is already used by a network flow protocol. The device identifiers may include an Internet Protocol address and a universally unique identifier (UUID) for the network appliance. The network flow exporter type and the device identifier may be added to the data portion of the network flow record instead of the header. These techniques may also include exporting a network flow options template that contains the device identifier in advance of exporting the packets to define one or more of a header format and data record format for the packets. The packets are received at a data collection device configured to collect network flow information. The data collection device stores network flow information for the distributed virtual switch based on the exporter type information and the device identifier.

The distributed exporter process described herein provides a multitude of advantages: 1) High Availability (HA) is achieved within the DVS since each line card will export data directly and there is no single point of failure, 2) network efficiency is achieved since there is no NetFlow traffic between the VSM and the line cards, 3) scalability is improved since the VSM is not involved in actual data export, and therefore, there is no impact on other VSM features and performance, and 4) NetFlow export does not get impacted when the control plane (VSM) is reloaded.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   at a network appliance that is part of a distributed virtual switch, obtaining network flow information for network flows passing through the network appliance;
   encapsulating the network flow information into packets as a network flow record for transport;
   adding network flow exporter type information to the network flow records configured to indicate that the packets are from a distributed exporter;
   exporting a template associating one or more network appliance identifiers to a distributed exporter identifier that uniquely identifies the distributed virtual switch; and
   exporting the packets.

2. The method of claim 1, wherein encapsulating comprises encapsulating the network flow information in accordance with a network flow protocol.

3. The method of claim 2, wherein encapsulating comprises encapsulating the network flow information in accordance with a network flow protocol comprising one of a NetFlow protocol and an Internet Protocol Flow Information eXport protocol.

4. The method of claim 1, wherein adding network flow exporter type information comprises adding a value representing a distributed exporter engine type to an engine type field.

5. The method of claim 1, wherein the distributed exporter identifier comprises one or more of an Internet Protocol address and a universally unique identifier.

6. The method of claim 1, wherein adding comprises adding the distributed exporter identifier device identifier to the network flow records.

7. The method of claim 1, wherein exporting a template comprises exporting, in advance of exporting the packets, a network flow options template to define one or more of a header format and data record format for the packets.

8. The method of claim 1, further comprising receiving the packets at a data collection device configured to collect network flow information.

9. The method of claim 8, and further comprising at the data collection device storing network flow information for the distributed virtual switch based on the exporter type information and the distributed exporter identifier.

10. The method of claim 8, wherein each packet contains a network appliance identifier and network flow exporter type information, and further comprising:
    in response to detecting that the network flow exporter type information indicates that the packets are from a distributed exporter, performing a lookup to determine the distributed exporter identifier associated with the network appliance identifier; and
    associating the network flow information with the distributed network identifier in order to analyze the network flows of the distributed virtual switch.

11. An apparatus comprising:
    a network interface unit configured to enable communications over a network and with a network flow data collector coupled to the network; and
    a processor configured to:
        obtain network flow information for network flows passing through the apparatus;
        encapsulate the network flow information into packets as a network flow record for transport;
        add network flow exporter type information to the network flow records configured to indicate that the packets are from a distributed exporter;
        export a template associating one or more network appliance identifiers to a distributed exporter identifier that uniquely identifies the distributed virtual switch; and
        export the packets via the network interface unit.

12. The apparatus of claim 11, wherein the processor is configured to encapsulate the network flow information in accordance with a network flow protocol.

13. The apparatus of claim 12, wherein the processor is configured to encapsulate the network flow information in accordance with a network flow protocol comprising one of a NetFlow protocol and an Internet Protocol Flow Information eXport protocol.

14. The apparatus of claim 11, wherein the processor is configured to add network flow exporter type information comprising a value representing a distributed exporter engine type to an engine type field.

15. The apparatus of claim 11, wherein the processor is configured to export the distributed exporter identifier that comprises one or more of an Internet Protocol address and a universally unique identifier.

16. The apparatus of claim 11, wherein the processor is configured to add the distributed exporter identifier to the network flow records.

17. The apparatus of claim 11, wherein the processor is configured to export, in advance of exporting the packets, a network flow options template to define one or more of a header format and data record format for the packets.

18. One or more non-transitory computer readable storage media storing instructions that, when executed by a processor, are operable to:
    obtain network flow information for network flows passing through a network appliance that is part of a distributed virtual switch;
    encapsulate the network flow information into packets as a network flow record for transport;
    add network flow exporter type information to the network flow records configured to indicate that the packets are from a distributed exporter;
    send a template associating one or more network appliance identifiers to a distributed exporter identifier that uniquely identifies the distributed virtual switch; and
    export the packets.

19. The computer readable storage media of claim 18, wherein the instructions operable to encapsulate comprise instructions operable to encapsulate the network flow information in accordance with a network flow protocol.

20. The computer readable storage media of claim 19, wherein the instructions operable to encapsulate comprise instructions operable to encapsulate the network flow information in accordance with a network flow protocol comprising one of a NetFlow protocol and an Internet Protocol Flow Information eXport protocol.

21. The computer readable storage media of claim 18, wherein the instructions operable to add network flow exporter type information comprise instructions operable to add a value representing a distributed exporter engine type to an engine type field.

22. The computer readable storage media of claim 18, wherein the distributed exporter identifier comprises one or more of an Internet Protocol address and a universally unique identifier.

23. The computer readable storage media of claim 18, wherein the instructions operable to add comprise instructions operable to add the distributed exporter identifier to the network flow records.

24. The computer readable storage media of claim 18, wherein the instructions operable to send comprise instructions operable to export, in advance of sending the packets, a network flow options template to define one or more of a header format and data record format for the packets.

* * * * *

UNITED STATES PATENT AND TRADEMARK OFFICE
CERTIFICATE OF CORRECTION

PATENT NO. : 8,654,765 B2  Page 1 of 1
APPLICATION NO. : 13/288417
DATED : February 18, 2014
INVENTOR(S) : Akshya Kumar Singh et al.

It is certified that error appears in the above-identified patent and that said Letters Patent is hereby corrected as shown below:

In the claims
Column 7, Line 47, delete the words "device identifier" after the words "exporter identifier"

Signed and Sealed this
Eighth Day of March, 2016

Michelle K. Lee
*Director of the United States Patent and Trademark Office*